(12) United States Patent
Nakagishi

(10) Patent No.: US 6,421,156 B1
(45) Date of Patent: Jul. 16, 2002

(54) GALVANO MIRROR UNIT

(75) Inventor: Toshio Nakagishi, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/951,465

(22) Filed: Sep. 14, 2001

Related U.S. Application Data

(62) Division of application No. 09/492,426, filed on Jan. 27, 2000, now Pat. No. 6,344,917, which is a continuation of application No. 09/173,678, filed on Oct. 16, 1998, now abandoned.

(30) Foreign Application Priority Data

Oct. 17, 1997 (JP) .............................. 9-303560
Oct. 17, 1997 (JP) .............................. 9-303561

(51) Int. Cl.[7] .............................. G02B 26/08
(52) U.S. Cl. .................. 359/198; 359/199; 359/212; 359/213; 359/214; 359/224
(58) Field of Search ................ 359/196–199, 359/212–214, 223, 224; 310/36; 346/107.3

(56) References Cited

U.S. PATENT DOCUMENTS

| 2,750,461 A | 6/1956 | Bunch |
| 3,244,917 A | 4/1966 | Gute |
| 3,354,833 A | 11/1967 | Laing |
| 4,088,914 A | 5/1978 | Aoki |
| 4,126,796 A | 11/1978 | Ito |
| 4,206,379 A | 6/1980 | Owda |
| 4,285,566 A | 8/1981 | Yamamoto |
| 4,297,713 A | 10/1981 | Ichikawa et al. |
| 4,351,596 A | 9/1982 | Ohniwa et al. |
| 4,466,088 A | 8/1984 | Trethewey |
| 4,891,998 A | 1/1990 | Tourville |
| 4,959,824 A | 9/1990 | Ueda |
| 4,968,876 A | 11/1990 | Iima |
| 5,125,750 A | 6/1992 | Corle et al. |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.

(List continued on next page.)

Primary Examiner—James Phan
(74) Attorney, Agent, or Firm—Greenblum & Bernstein, P.L.C.

(57) ABSTRACT

A galvano mirror unit including a galvano mirror, a mirror holder holding the galvano mirror, and a hinge member which swingably supports the mirror holder. A pair of coils is provided at opposing ends of the mirror holder. A pair of conductive members is provided in the hinge member, so that an electrical signal can be supplied to the coils via the conductive members.

5 Claims, 12 Drawing Sheets

U.S. PATENT DOCUMENTS

| | | |
|---|---|---|
| 5,126,899 A | 6/1992 | Kanazawa |
| 5,136,559 A | 8/1992 | Nakayama |
| 5,151,890 A | 9/1992 | Yonekubo |
| 5,220,550 A | 6/1993 | Nakayama |
| 5,254,893 A | 10/1993 | Ide |
| 5,365,504 A | 11/1994 | Noguchi |
| 5,420,848 A | 5/1995 | Date et al. |
| 5,422,872 A | 6/1995 | Hsu et al. |
| 5,444,683 A | 8/1995 | Ishikawa |
| 5,461,498 A | 10/1995 | Iwao |
| 5,517,474 A | 5/1996 | Takamine |
| 5,532,480 A | 7/1996 | Scofield |
| 5,564,585 A | 10/1996 | Saitoh |
| 5,596,446 A | 1/1997 | Plesko |
| 5,608,280 A | 3/1997 | Tamemoto et al. |
| 5,610,752 A | 3/1997 | Hayakawa |
| 5,625,244 A | 4/1997 | Bradfield |
| 5,684,762 A | 11/1997 | Kubo |
| 5,705,868 A | 1/1998 | Cox et al. |
| 5,719,834 A | 2/1998 | Futagawa et al. |
| 5,764,613 A | 6/1998 | Yamamoto |
| 5,768,241 A | 6/1998 | Kanazawa et al. |
| 5,844,676 A | 12/1998 | Southam et al. |
| 5,886,438 A | 3/1999 | Kawanishi |
| 5,920,140 A | 7/1999 | Nakagishi et al. |
| 6,278,682 B1 | 8/2001 | Takishima et al. |
| 6,292,447 B1 | 9/2001 | Takishima et al. |

OTHER PUBLICATIONS

An article entitled "Optical Magnetic Disk Device Of U.S. TeraStor Succeeds Tracking Control—Track Pitch Of 0.34 μm Realized Using Two–Stage Servo", which appeared at pp. 13 and 14 of the Japanese language magazine *Nikkei Electronics*, Sep. 22, 1997 (No. 699).

An article entitled "Trillions Of Bytes", by Eric Nee, which appeared in the Mar. 24, 1997 issue of Forbes magazine.

A screen capture of a page from TeraStor's website (dated Mar. 19, 1997) entitled "Architecture of TeraStor's Near–Field Technology".

An article entitled "In 1998, 10 GB Per $Inch^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

GALVANO MIRROR UNIT

This is a divisional of U.S. patent application Ser. No. 09/492,426, filed Jan. 27, 2000, U.S. Pat. No. 6,344,917, which is a continuation of U.S. patent application Ser. No. 09/173,678, filed Oct. 16, 1998, now abandoned the contents both of which are expressly incorporated by reference herein in their entireties.

BACKGROUND OF THE INVENTION

This invention relates to an optical disk drive.

Generally, an optical disk drive is arranged to write and read data on an optical disk by means of a laser beam. The optical disk drive includes a light source module that emits the laser beam and an optical head carrying an objective lens that converges the laser beam on a small light spot on the optical disk.

The tracking operation of the optical disk drive includes (1) a rough tracking operation and (2) a fine tracking operation. The rough tracking operation is accomplished by moving the optical head crossing the tracks of the optical disk. The fine tracking operation is accomplished by minutely moving the light spot on the optical disk. For this purpose, a galvano mirror is provided in a light path between the light source module and the objective lens. When the galvano mirror is swung by a certain degree, the angle of incidence of the laser beam incident on the objective lens is changed, so that the light spot on the optical disk is moved.

Generally, a galvano mirror is mounted to a swingable mirror holder. Coils are provided to opposing ends of the mirror holder. Magnets are provided to a stationary part of the optical head so that the magnets are faced with the coils. The galvano mirror is swung by an electromagnetic induction caused by current flow in the coils and a magnetic field caused by the magnets.

In order to swingably support the mirror holder, it is necessary to provide a pivoting mechanism such as pivoting shafts and bearings. However, if such a pivoting mechanism is provided to the mirror holder, it may increase the size of a galvano mirror unit (including the galvano mirror, the mirror holder and the pivoting mechanism), particularly in the direction of a swinging axis of the galvano mirror. Thus, it is desired to provide a simple arrangement for swingably supporting the galvano mirror.

Further, in order to connect the coils of the mirror holder to a control circuit (provided on the stationary part), wires are laid between the mirror holder and the control circuit. Accordingly, when the galvano mirror is swung, the wires also move and may disturb the swinging of the galvano mirror. Thus, it is desired to provide an electrical feeding path which does not disturb the swinging of a galvano mirror.

SUMMARY OF THE INVENTION

It is therefore an object of the present invention to provide a galvano mirror unit in which a galvano mirror is supported in a simple manner.

Further, it is another object of the present invention to provide a galvano mirror unit in which an electrical feeding path does not disturb the swinging of a galvano mirror.

According to one aspect of the present invention, there is provided a galvano mirror unit including a galvano mirror, a mirror holder holding the galvano mirror, and a hinge member which swingably supports the mirror holder. The hinge member includes a support plate and a base. The support plate has a thinner portion extending across the support plate in one direction, so that the thinner portion divides the support plate into first and second sections. The first section is fixed to the mirror holder, while the second section is supported by the base. The mirror holder is swingable about the thinner portion, due to an elastic deformation of the thinner portion.

With such an arrangement, it, is not necessary to provide a pivoting mechanism such as pivoting shafts. Thus, the structure of the galvano mirror unit is simple, which is advantageous in miniaturization of the galvano mirror unit.

In a particular arrangement, the support plate has a rectangular-shape. The thinner portion is formed in the vicinity of one end of the support plate and is extended in parallel to the end.

In a preferred embodiment, when the thinner portion is not elastically deformed, the first and second sections are aligned on one plane. The plane is perpendicular to a mirror surface of the galvano mirror. Accordingly, the hinge member is able to resist against the force in the direction perpendicular to a mirror surface of the galvano mirror.

Advantageously, the mirror holder includes a mirror mounting portion to which the galvano mirror is mounted, and a recess in which the support plate is inserted. The recess is located to an opposing side to the mirror mounting portion. Since the support plate is inserted in the recess of the mirror holder, a space occupied by the hinge member is relatively small.

According to another aspect of the present invention, there is provided a galvano mirror holder having a mirror mounting portion to which the galvano mirror is mounted, a pair of coils provided to opposing ends of the mirror holder, and a hinge member which swingably supports the mirror holder. The hinge member is located at an opposing side to the mirror mounting portion of the mirror holder. With such an arrangement, the hinge member is able to resist against the force in the direction perpendicular to a mirror surface of the galvano mirror.

According to still another aspect of the present invention, there is provided a galvano mirror unit including a galvano mirror, a mirror holder holding the galvano mirror, a hinge member which swingably supports the mirror holder, a pair of coils provided at opposing ends of the mirror holder, and a pair of conductive members is provided in the hinge member. Electricity can be supplied to the coils via the conductive members.

With such an arrangement, it is not necessary to fix wires to the mirror holder. Thus, when the mirror holder swings, the swinging of the mirror holder is not disturbed by such wires.

In a particular arrangement, the conductive members respectively have contact surfaces which are exposed to an exterior of the hinge member. The mirror holder has mating surfaces which contact with the contact surfaces of the conductive members.

DESCRIPTION OF THE PREFERRED EMBODIMENT

The embodiments of the galvano mirror unit according to the present invention are described below.

Figure 1:
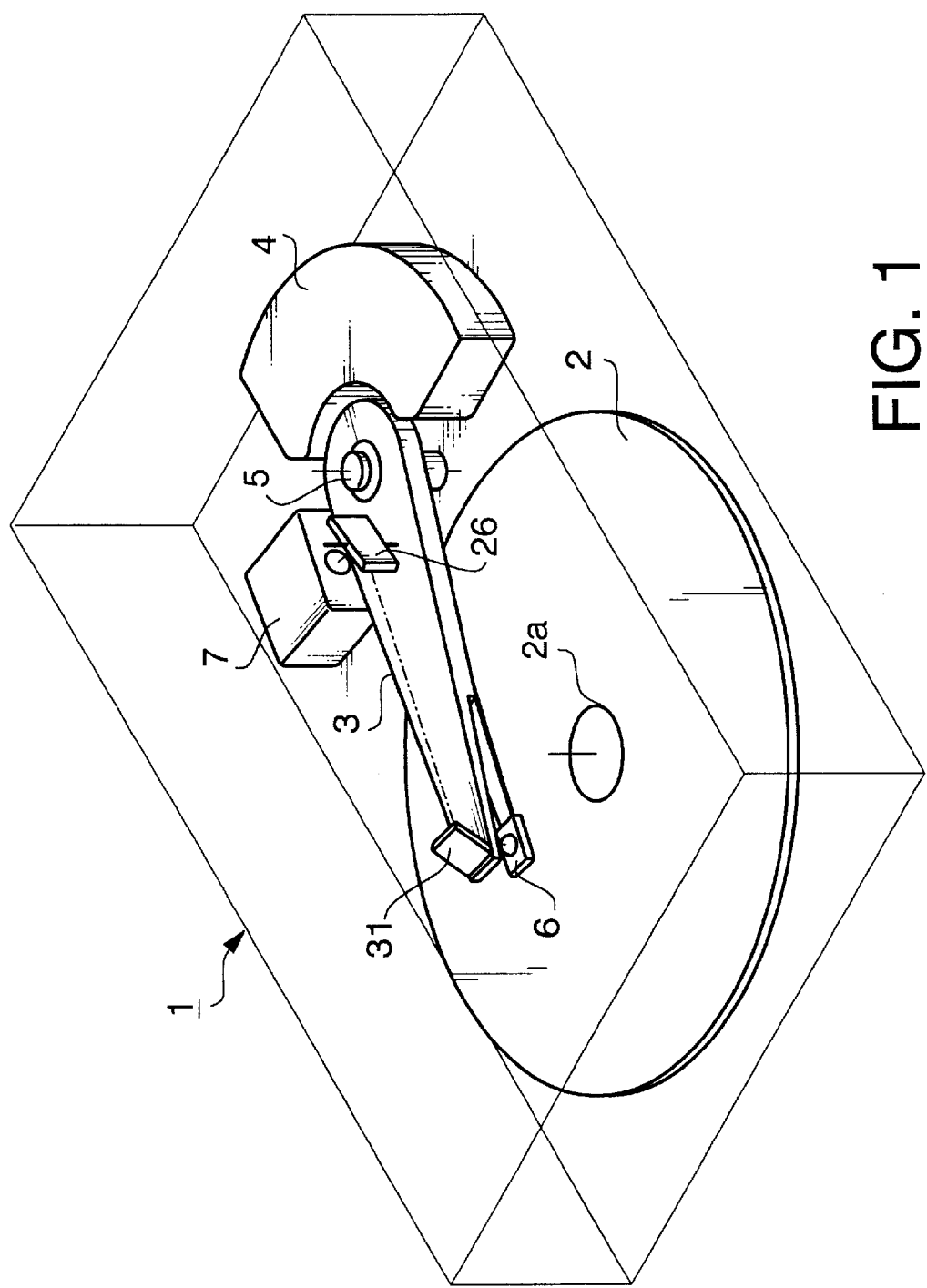
FIG. 1 is perspective view of an optical disk drive to which first and second embodiments of the present invention are embodied.

First, an optical disk drive in which the first and second embodiments are embodied is described. FIG. 1 is a perspective view of the optical disk drive (hereinafter, the disk drive 1). The disk drive 1 is arranged to write and read data on an optical disk 2 by means of a so-called Near Field Recording (NFR) technology.

In the disk drive 1, the optical disk 2 is mounted to a rotating shaft 2a of a not-shown spindle motor. The disk drive 1 includes a rotary arm 3 extending in parallel to a surface of the optical disk 2, and is rotatably supported by a shaft 5. A floating head 6 that carries an optical lens (described later) is provided to a tip of the rotary arm 3. When the rotary arm 3 is rotated, the floating head 6 moves across tracks formed on the optical disk 2. The rotary arm 3 is further provided with a light source module 7 in the vicinity of the shaft 5.

Figure 2:
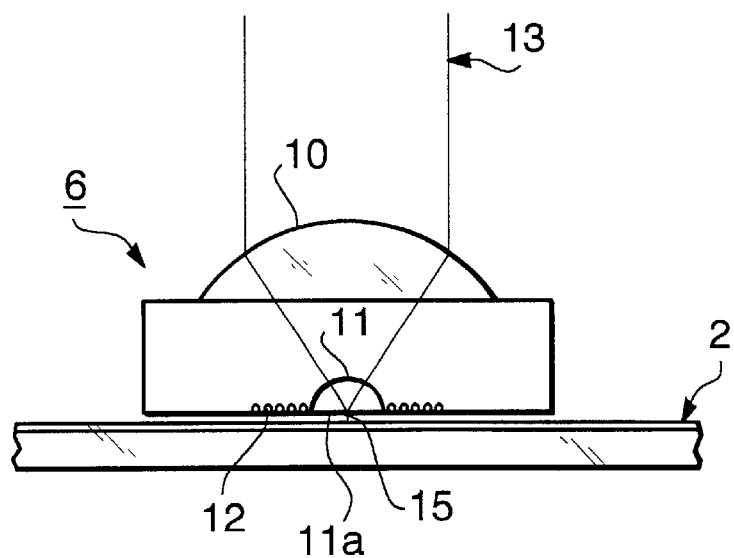
FIG. 2 is an enlarged view of a floating head of the optical d of FIG. 1.
Figure 3:
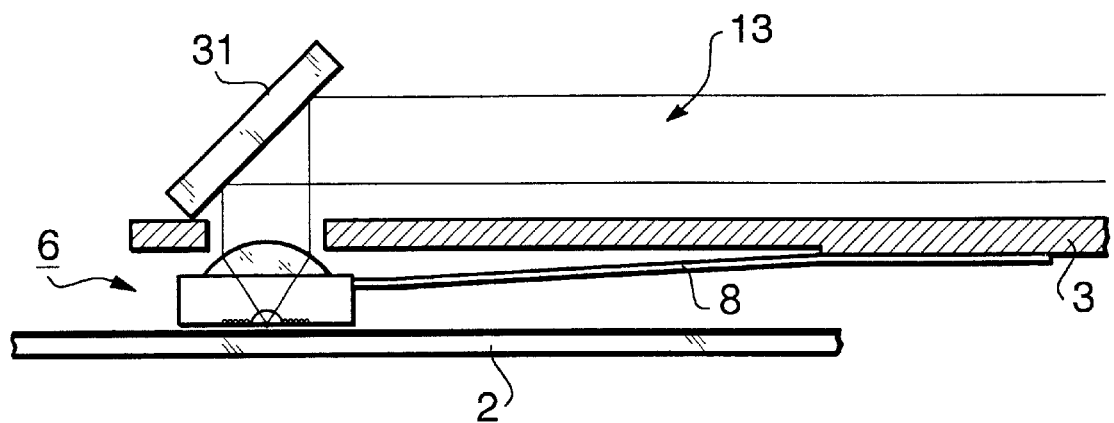
FIG. 3 is an enlarged view of the tip of the rotary arm of the optical disk of FIG. 1.

FIG. 2 is an enlarged view of the floating head 6. FIG. 3 is an enlarged view of the tip of the rotary arm 3. As shown in FIG. 3, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disk 2 rotates, the floating head 6 is lifted upward by air flow generated between the optical disk 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIGS. 2 and 3, the floating head 6 includes an objective lens 10 and a solid immersion lens (SIL) 11. A reflecting mirror 31 is provided to the rotary arm 3, which reflects the laser beam 13 emitted from the light source module 7 (FIG. 1) to the objective lens 10. The objective lens 10 converges the laser beam 13. The solid immersion lens 11 is a hemispherical lens and: the plane surface thereof is faced with the optical disk 2. Further, the focal point of the objective lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 μm, the converged laser beam is converted to a so-called evanescent beam (which propagates across a small gap between closely disposed surfaces) and reaches the optical disk 2. Since the beam diameter of the evanescent beam is smaller than the converged laser beam, a data storage capacity can be remarkably increased. The evanescent beam is disclosed in B. D. Terris, H. J. Mamin, and D. Rugar "Near-field optical data storage", Appl. Phys. Lett., Vol. 68, No. 2, Jan. 8, 1996, teaching of which are incorporated by reference in their entireties.

In order to apply magnetic field on the surface of the optical disk 2, a coil 12 is provided around the solid immersion lens 11. A current flow in the coil 12 generates a magnetic field in which the optical disk 2 is positioned. Data writing is performed by the evanescent beam from the solid immersion lens 11 and the magnetic field generated by the coil 12.

Figure 4:
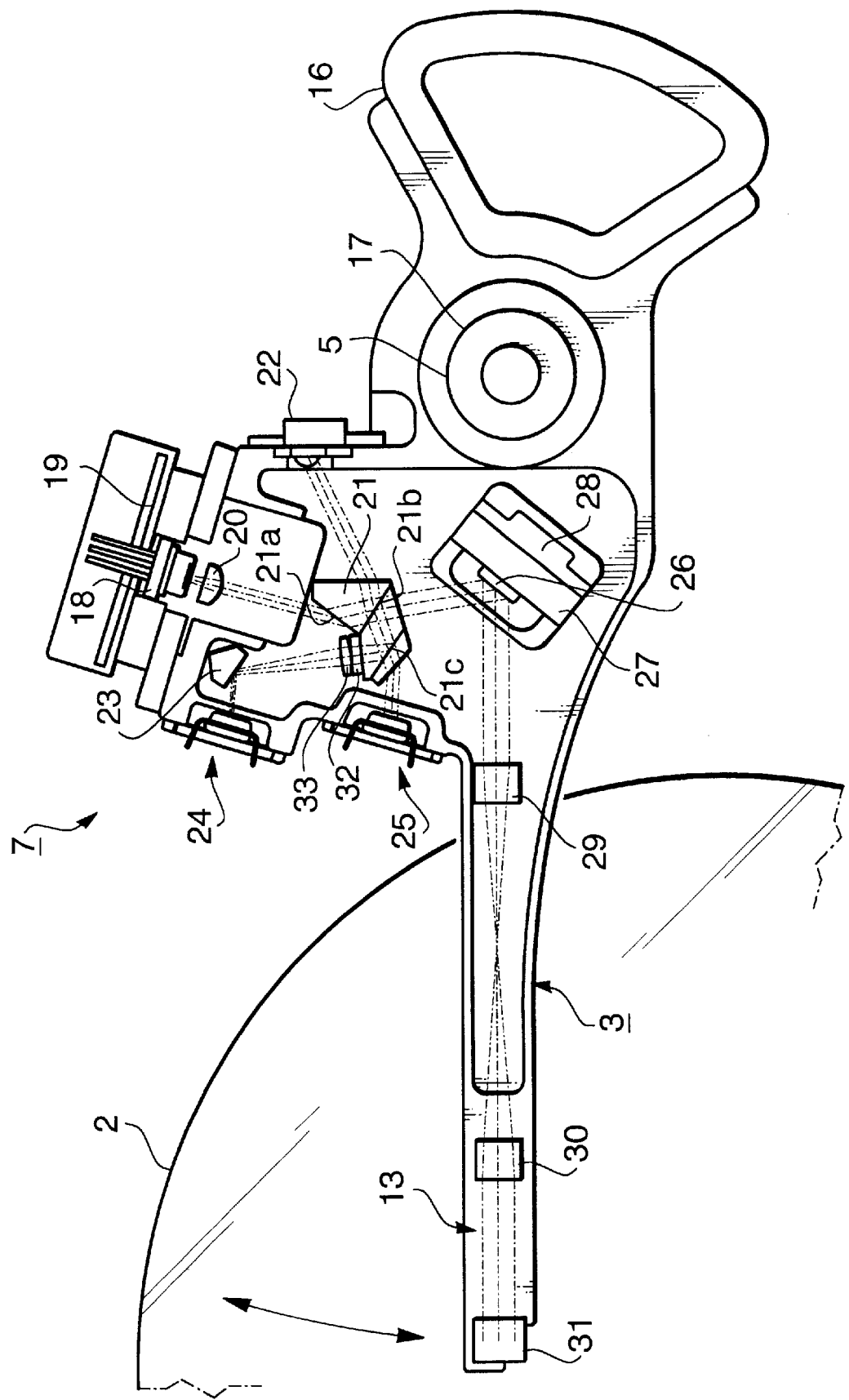
FIG. 4 is a top view of the rotary arm of the optical disk of FIG. 1.
Figure 5:
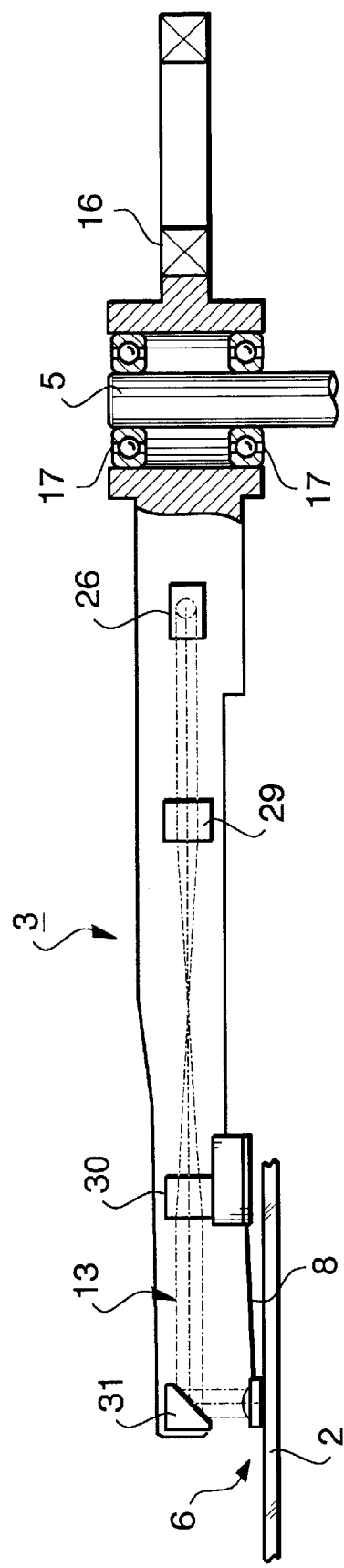
FIG. 5 is a longitudinal sectional view of the rotary arm of the optical disk of FIG. 1.

FIGS. 4 and 5 are a plan view and a sectional view of the rotary arm 3. As shown in FIGS. 4 and 5, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 1) The rotary arm 3 is supported by the shaft 5 via bearings 17. When current flows in the driving coil 16, the rotary arm 3 is rotated about the axis 5, due to the electromagnetic induction.

As shown in FIGS. 4 and 5, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. For this purpose, a galvano mirror 26 is provided in a light path between the light source module 7 and the objective lens 10. In particular, the galvano mirror 26 is locate so that the laser beam 13 emitted from the light source module 7 directly enters. The laser beam 13 reflected by the galvano mirror 26 proceeds to the reflection mirror 31 and is reflected (by the reflection mirror 31) to the floating head 6. Then, the laser beam 13 is converged and incident on the optical disk 2. By swinging the galvano mirror 26, the incident angle of the laser beam 13 incident on the objective lens 10 is changed, so that the light spot on the optical disk 2 is moved. The swinging angle of the galvano mirror 26 is detected by a galvano mirror positioning sensor 28 located in the vicinity of the galvano mirror 26.

When the galvano mirror 26 swings to change the incident angle of the laser beam 13 incident on the objective lens 10, there is a possibility that the laser beam 13 partially fails to enter the objective lens 10. In order to solve this problem, first and second relay lenses 29 and 30 are provided between the galvano mirror 26 and the reflection mirror 31 to obtain the conjugate relationship between a principal plane of the objective lens 10 and the center of the mirror surface of the galvano mirror 26 (in the vicinity of the. swinging axis thereof) With this, the laser beam 13 reflected by the galvano mirror 26 is surely enter the objective lens 10 irrespective of the swinging of the galvano mirror 26.

The laser beam 13 that has returned from the surface of the optical disk 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam that transmits the second half mirror surface 21c is directed to the tracking detection sensor 25. The tracking detection sensor 25 outputs a track error signal based on the incident laser beam. The laser beam that has reflected by the second half mirror surface 21c is split by a Wollaston polarizing prism 32, generating two polarized beams. The polarized beams are converged (by a converging lens 33) on the data detection sensor 24 via reflection prism 23. The data detection sensor 24 has two light receiving portions which respectively receives two polarized beams. With this, the data detection sensor 24 reads data recorded on the optical disk 2. In particular, the data signal from the tracking detection sensor 25 and data detection sensor 24 are generated by a not-shown amplifier circuit and sent to a not-shown control circuit.

Figure 6:
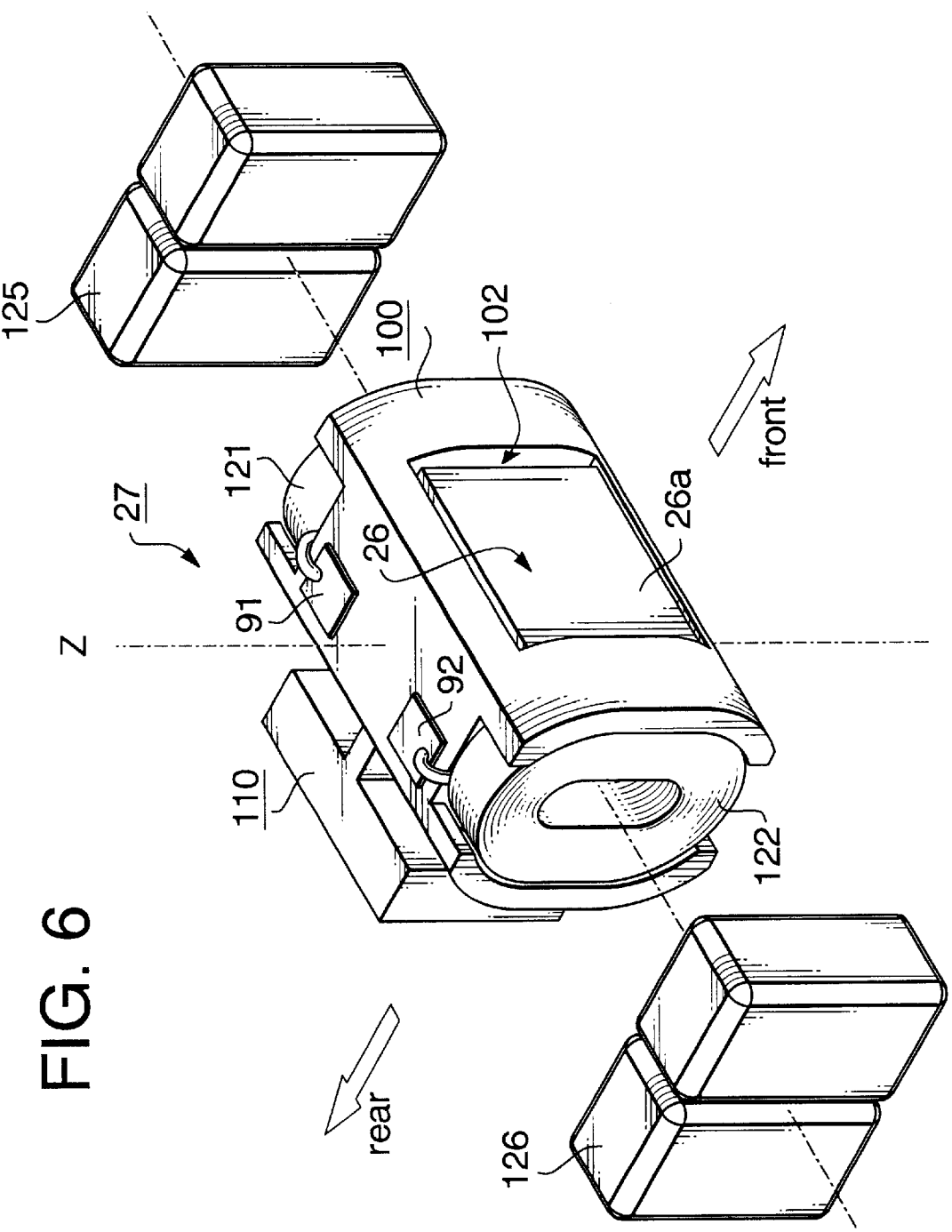
FIG. 6 is a perspective view of a galvano mirror unit according to the first embodiment.

FIG. 6 is a perspective view of a galvano mirror unit according to the first embodiment. The galvano mirror 26 is mounted to a mirror holder 100. The mirror holder 100 is supported by a hinge member 110 so that the mirror holder 100 is swingable about a swinging axis Z. Hereinafter, the direction in parallel to the swinging axis Z is referred to as a vertical direction. Further, a plane that is perpendicular to the swinging axis Z is referred to as a horizontal plane. Further, the galvano mirror 26 side of the mirror holder 100 is referred to as 'front', while the opposite side of the mirror holder 100 is referred to as 'rear'.

As shown in FIG. 6, a pair of coils 121 and 122 are provided to lateral side ends of the mirror holder 100. Further, a pair of magnets 125 and 126 are provided on the rotary arm 3 (FIG. 4). The magnets 125 and 126 generate a magnetic field in which the coils 121 and 122 are positioned. positioned. Lead wires of coils 121 and 122 are respectively connected to terminals 91 and 92 provided on a top surface of the mirror holder 100. The terminals 91 and 92 are connected to a not-shown control circuit via not-shown wires. When current flows in the coils 121 and 122, the mirror holder 100 is swung about the swinging axis Z due to the electromagnetic induction caused by the current and the magnetic field. With such an arrangement, the galvano mirror 26 can be swung thereby to change the direction of the laser beam reflected by the galvano mirror 26.

The mirror holder 100 is provided with a mirror holding recess 102 provided between the coils 121 and 122. The galvano mirror 26 is mounted to the mirror holding recess 102 so that its mirror surface directs to the exterior of the mirror holding recess 102. The mirror surface of the. galvano mirror 26 (mounted to the mirror holder 100) is parallel to the swinging axis Z. Further, the swinging axis Z is located at the lateral center of the galvano mirror 26 when seen from the front.

Figure 7:
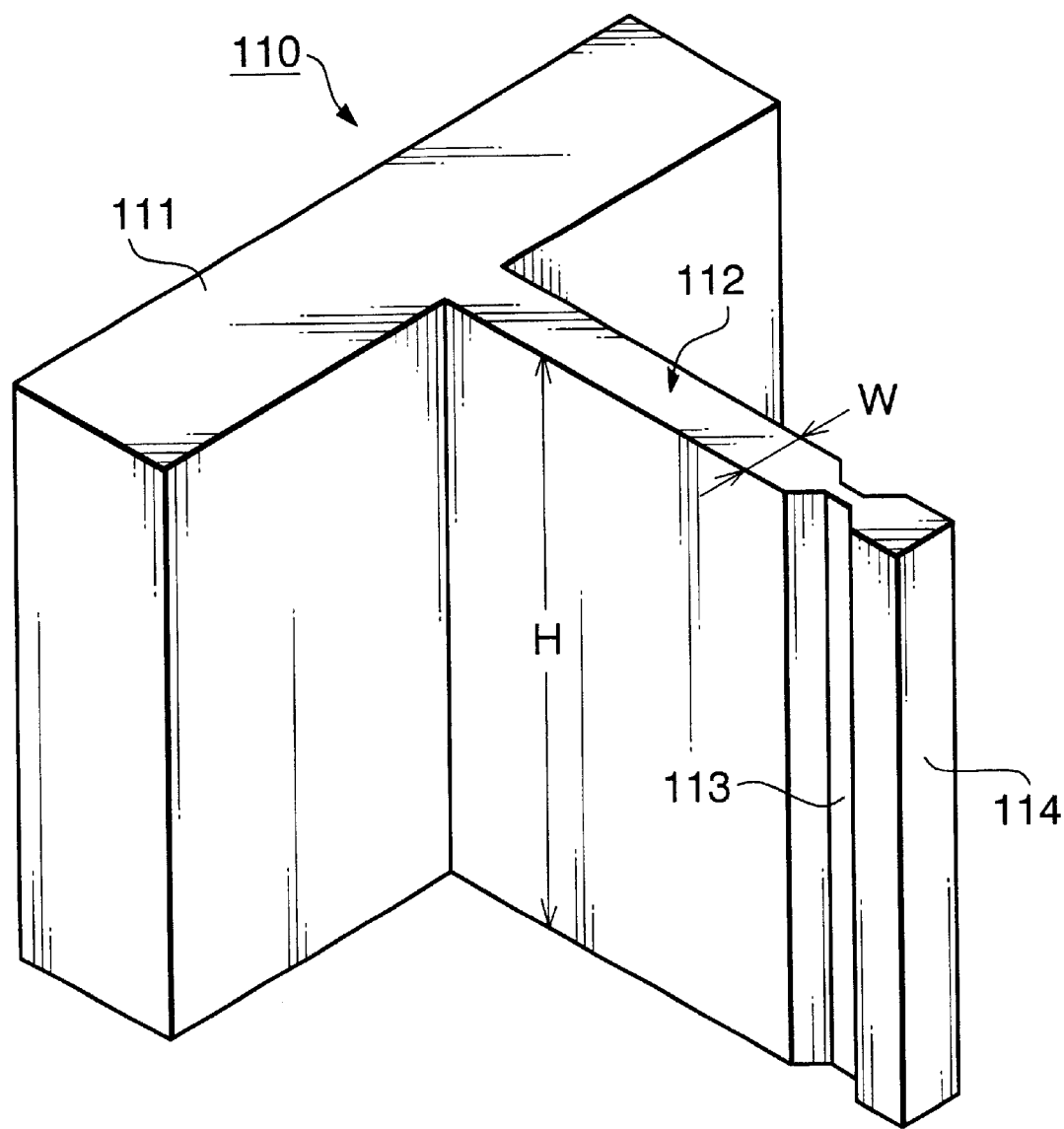
FIG. 7 is a perspective view of a hinge member according to the first embodiment.

FIG. 7 is a perspective view of the hinge member 110. The hinge member 110 is T-shaped, including vertically provided two rectangular plates: a base plate 111 and a support plate 112. The base plate 111 is supported on an arm base B (FIG. 9) of the rotary arm 3 (FIG. 4). The support plate 112 extends from the lateral center of the base plate 111. The support plate 112 of the hinge member 110 has a certain height H and a certain width W. Further, the support plate 112 has a thinner portion 113 which is thinner than the remaining portion of the support plate 112. The thinner portion 113 is formed at the vicinity of a tip 114 of the support plate 112. The thinner portion 113 extends vertically across the support plate 112. Due to the elastic deformation of the thinner portion 113, the tip 114 of the support plate 112 is swingable with respect to the remaining portion of the support plate 112.

Figure 8:
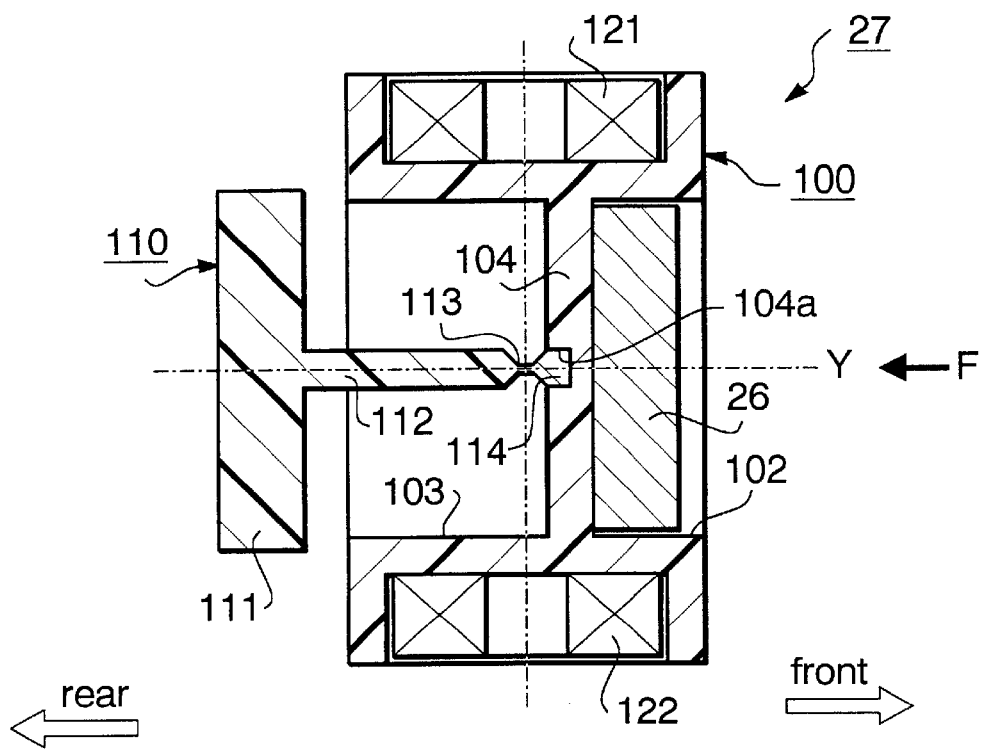
FIG. 8 is a horizontal sectional view of the galvano mirror unit of FIG. 6.
Figure 9:
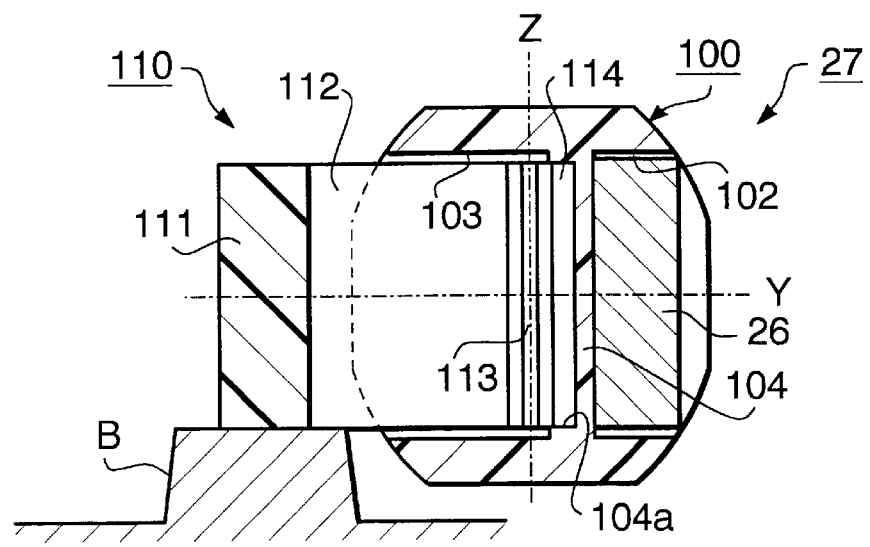
FIG. 9 is a longitudinal sectional view of the galvano mirror unit of FIG. 6.

FIGS. 8 and 9 are a horizontal sectional view and a longitudinal sectional view of the galvano mirror unit. As shown in FIG. 8, the mirror holder 100 has a rear recess 103 at an opposing side to the mirror mounting recess 102. The rear recess 103 has height and width such that the support plate 112 of the hinge. 110 is inserted therein. The rear recess 103 has a depth (that is, a dimension in the front-rear direction) such that the swinging axis Z is positioned in the recess 103. A vertically extending groove 104a is formed on a surface 104 of the rear recess 103. The support plate 112 is inserted in the rear recess 103, and the tip 114 of the support plate 112 fits into the vertically extending, groove 104a. With this, the mirror holder 100 is mounted to the hinge member 110. The mirror holder 100 mounted to the tip 114 of the support plate 112 is swingable with respect to the remaining portion of the support plate 112 and the base plate 111. As shown in FIG. 9, the thinner portion 113 of the support plate 112 is aligned with the swinging axis Z.

With such an arrangement, the mirror holder 100 is supported by the hinge member 110 so that the mirror holder 100 is swingable about the swinging axis Z. When the mirror holder 100 swings from a neutral position (in which the support plate 112 straightly extends), the mirror holder 100 is biased toward its neutral position by the elastic force of the thinner portion 113.

Further, when the mirror holder 100 is at the neutral position, the mirror holder 100 is supported by the hinge member 111 from the back. With this, the mirror holder 100 is able to resist against the force (shown by an arrow F in FIG. 8) in the direction perpendicular to the mirror surface of the galvano mirror 26. Further, since the tip 114 of the support plate 112 abuts the mirror holder 110 along the vertical dimension of the galvano mirror 26, the inclination of the galvano mirror 26 is prevented.

As constructed above, according to the first embodiment, the galvano mirror 26. (and the mirror holder 100) can be supported in a simple structure.

Figure 10:
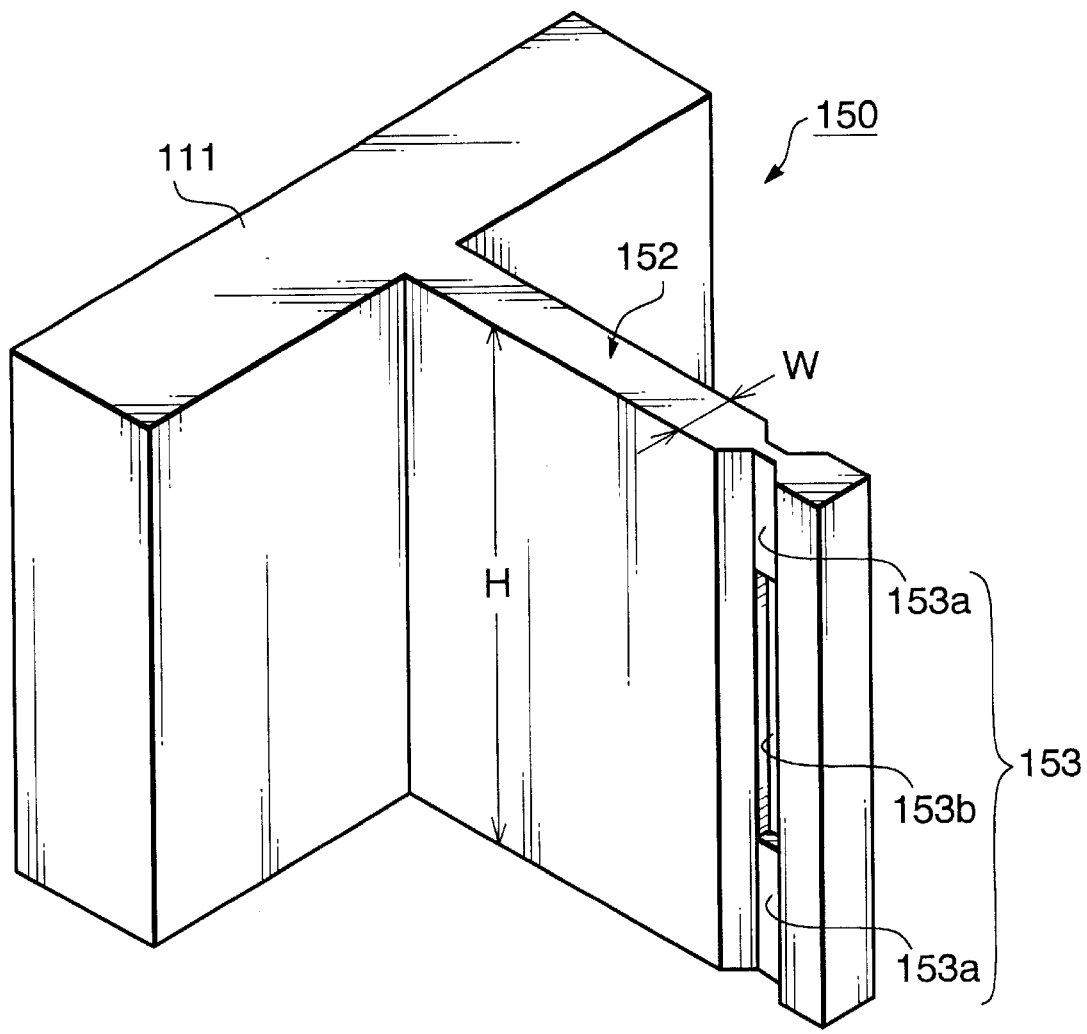
FIG. 10 is a perspective view of a hinge member according to the modification of the first embodiment.

FIG. 10 is a perspective view of a hinge member 150 according to a modification of the first embodiment. In this modification, a thinner portion 153 of a support plate 152 of the hinge member 150 has an opening 153b formed in the longitudinal center thereof. Two bridging portions 153a are formed on upper and lower sides of the opening 153b. Other structure of the hinge member 150 (except the thinner portion 153) is the same as the hinge member 110 of the first embodiment. The mirror holder 100 (FIG. 6) is mounted to the tip of the support plate 152 of the hinge member 150, so that the mirror holder 100 is swingable about the thinner potion 153.

Due to the existence of the opening 153b, the elastic force of the thinner portion 153 is weak (compared with the first embodiment). Thus, the mirror holder 100, can be swung by a relatively light force.

Figure 11:
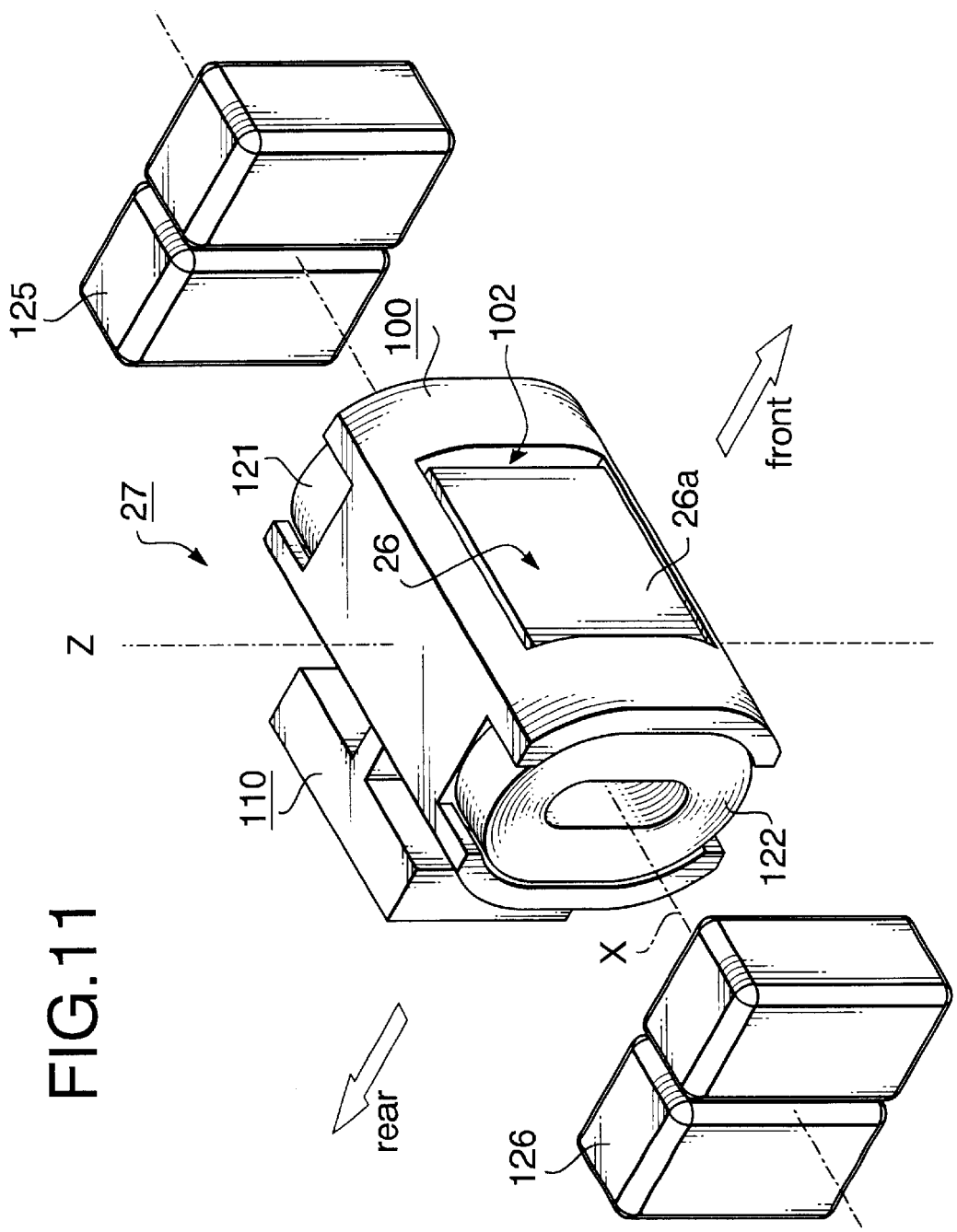
FIG. 11 is a perspective view of a galvano mirror unit according to the second embodiment.

The second embodiment of the present invention is described. FIG. 11 is a perspective view of the galvano mirror unit of the second embodiment. In FIG. 11, parts having the same structure as the first embodiment are denoted by same reference numbers.

As shown in FIG. 11, the mirror holder 100 is not provided with terminals such as the terminals 91 and 92 (FIG. 6) of the first embodiment. Instead, electrical feeding paths (for feeding electricity to the coils 121 and 122) are provided in the hinge member 110 as detailed below.

Figure 12:
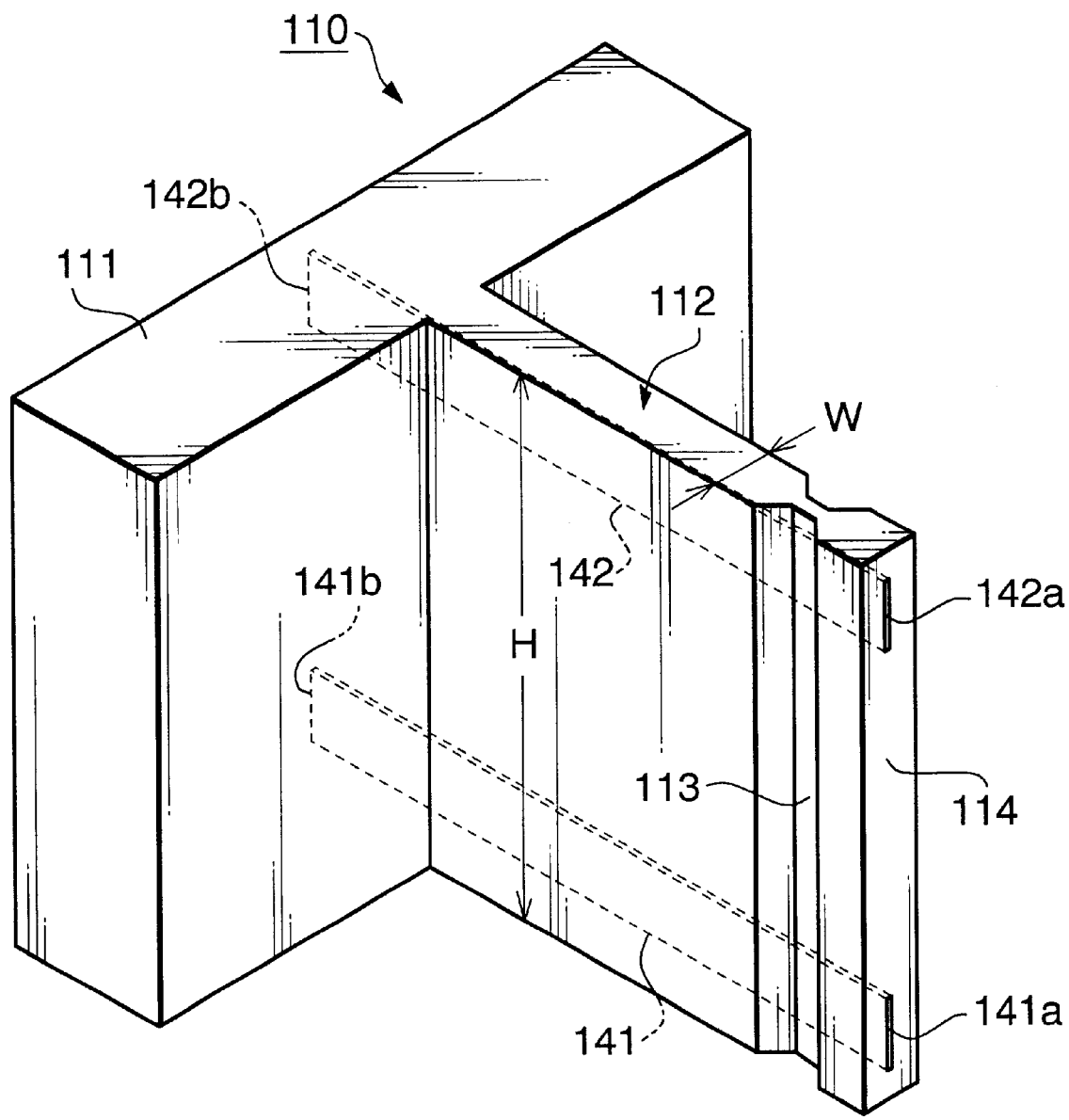
FIG. 12 is a perspective view of a hinge member according to the second embodiment.

FIG. 12 is a perspective view of the hinge member 110 of the second embodiment. The hinge member 110 is made of insulation material. The hinge member 110 is provided with two band-shaped conductive members 141 and 142 extending through the interior of the base plate 111 and the support plate 112. The conductive members 141 and 142 are located at the upper and lower portions thereof and extend from the rear side of the base plate 111 to the tip 114 of the support plate 112. The conductive members 141 and 142 are made of copper foils or copper wires. At the tip 114 of the support plate 112, the conductive members 141 and 142 are exposed to the exterior, which respectively form contact surfaces 141a and 142a. Further, at the rear surface of the base plate 111, the conductive members 141 and 142 are exposed to the exterior, which respectively form connector surfaces 141b and 142b.

Figure 13:
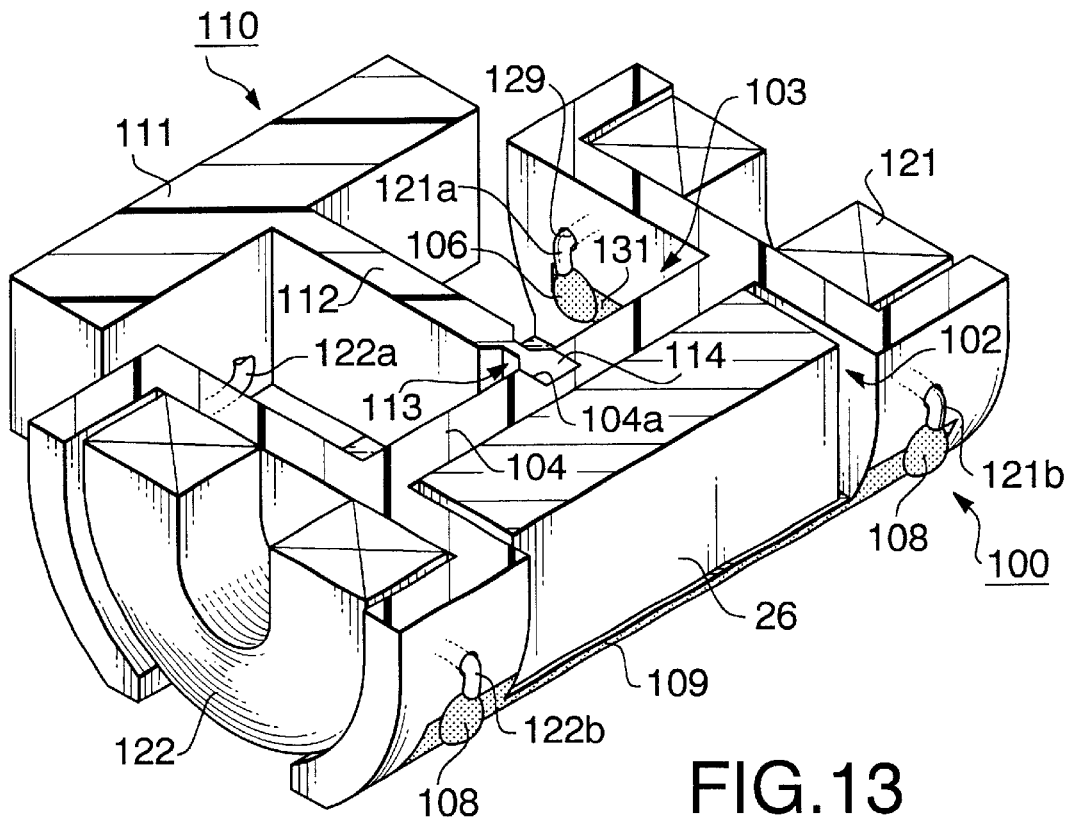
FIG. 13 is a partially cutaway view of a galvano mirror unit of 11, with its upper half being removed.
Figure 14:
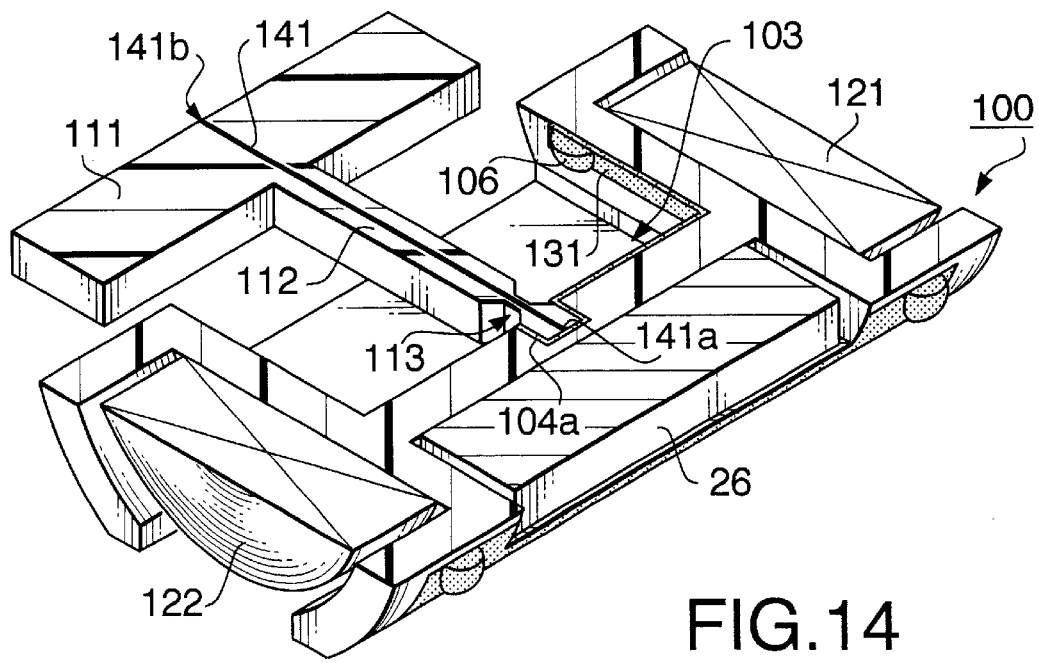
FIG. 14 is a partially cutaway view of a galvano mirror unit of FIG. 11, showing its lower part.

FIG. 13 is a partially cutaway view of the galvano mirror unit, with its upper half being removed. FIG. 14 is a partially cutaway view showing a lower part of the galvano mirror unit. The mirror holder 100 is made of insulating material. As shown in FIG. 13, the right coil 121 has first and second lead wires 121a and 121b. Similarly, the left coil 122 has first and second lead wires 122a and 122b. The second lead wires 121b and 122b are drawn to the front surface of the mirror holder 100 and attached to a common terminal 109 (by soldering 108) formed on the front surface of the mirror holder 100. With this, the coils 121 and 122 are electrically connected with each other.

As shown in FIG. 13, the first lead wire 121a of the right coil 121 is drawn to the inner surface of the rear recess 103 and is soldered to a conductive pattern 131 formed on the inner surface of the rear recess 103. As shown in FIG. 14, the conductive pattern 131 extends to the vertically extending groove 104a so that the conductive pattern 131 contacts the contact surface 141a of the conductive member 141. With this, the right coil 121 and the conductive member 141 are electrically connected.

Figure 15:
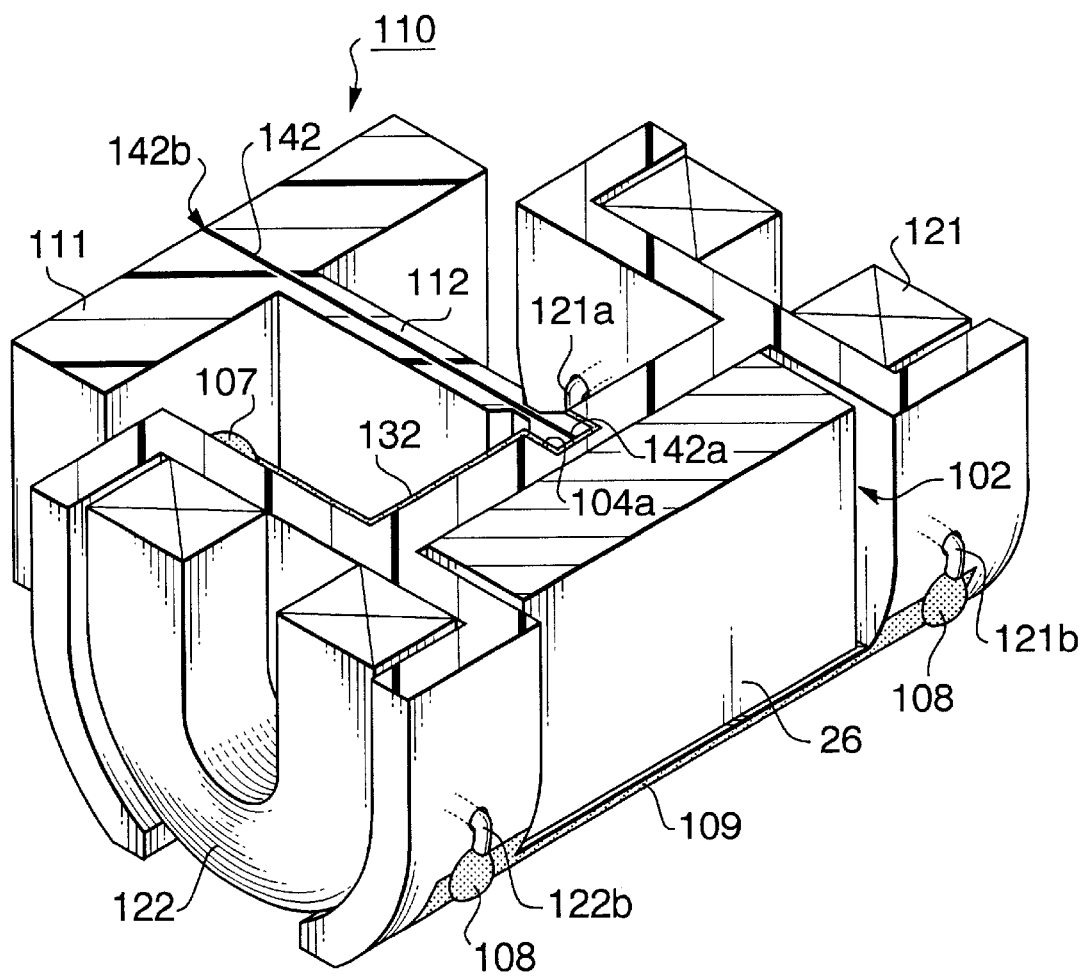
FIG. 15 is a partially cutaway view of a galvano mirror unit of FIG. 11, showing its upper part.

FIG. 15 is a partially cutaway view showing the upper portion of the galvano mirror unit. The first lead wire 122a (FIG. 13) of the left coil 122 is drawn to the inner surface of the rear recess 103 and is soldered to the conductive pattern 132 formed on the inner surface of the rear recess 103. The conductive pattern 132 extends to the vertically extending groove 104a so that the conductive pattern 132 contacts the contact surface 142a of the conductive member 142. With this, the left coil 122 and the conductive member 142 are electrically connected.

With such an arrangement, (1) the conductive member 141, (2) the conductive pattern 131, (3) the right coil 121, (4) the common terminal 109, (5) the left coil 122, (6) the conductive pattern 132 and (7) the conductive member 142 are connected in series. Since the mirror holder 100 and the hinge member 110 are made of insulating material, a short-circuit is prevented. By connecting the connector surface 141b and 142b to a not-shown control circuit by means of not-shown wires, it becomes possible to supply electricity to the coils 121 and 122.

As described above, according to the second embodiment, it is not necessary to fix wires to the mirror holder 100. Thus, the swinging of the galvano mirror 26 is not disturbed by the wires.

Although the galvano mirror unit of the present invention is described herein with respect to the preferred embodiments, many modifications and changes can be made without departing from the spirit and scope of the invention.

The present disclosure relates to subject matters contained in Japanese Patent Application Nos. HEI 9-303560, filed on Oct. 17, 1997 and HEI 9-303561, filed on Oct. 17, 1997 which are expressly incorporated herein by reference in their entirety.

What is claimed is:

1. A galvano mirror unit, comprising:
   a galvano mirror;
   a mirror holder holding said galvano mirror;
   a hinge member which swingably supports said mirror holder;
   a pair of coils provided at opposing ends of said mirror holder; and
   a pair of conductive members provided in said hinge member,
   wherein electricity can be supplied to said coils via said conductive members.

2. The galvano mirror unit according to claim 1, said conductive members respectively having contact surfaces which are exposed to an exterior of said hinge member.

3. The galvano mirror unit according to claim 2, said mirror holder having mating surfaces which contact with said contact surfaces of said conductive members.

4. The galvano mirror unit according to claim 1, wherein said hinge member is made of insulation material.

5. The galvano mirror unit according to claim 1, wherein said mirror holder is made of insulation material.

* * * * *